US012806847B2

(12) United States Patent
Vogler et al.

(10) Patent No.: US 12,806,847 B2
(45) Date of Patent: Nov. 24, 2026

(54) APPARATUS AND METHOD FOR FORMING PLASTIC PREFORMS INTO PLASTIC CONTAINERS WITH REGULATION OF THE PRESSURE RISE TIME

(71) Applicant: KRONES AG, Neutraubling (DE)

(72) Inventors: Daniel Vogler, Neutraubling (DE); Jochen Hirdina, Regensburg (DE); Benedikt Hengl, Essing (DE); Markus Kulzer, Zell (DE)

(73) Assignee: KRONES AG, Neutraubling (DE)

( * ) Notice: Subject to any disclaimer, the term of this patent is extended or adjusted under 35 U.S.C. 154(b) by 31 days.

(21) Appl. No.: 18/243,995

(22) Filed: Sep. 8, 2023

(65) Prior Publication Data

US 2024/0083097 A1 Mar. 14, 2024

(30) Foreign Application Priority Data

Sep. 8, 2022 (DE) ..................... 10 2022 122 885.1

(51) Int. Cl.
*B29C 49/78* (2006.01)
*B29C 49/00* (2006.01)
(Continued)

(52) U.S. Cl.
CPC ........ *B29C 49/783* (2013.01); *B29C 49/0062* (2022.05); *B29C 49/42065* (2022.05);
(Continued)

(58) Field of Classification Search
CPC ......... B29C 49/78; B29C 49/00; B29C 49/42; B29C 49/783; B29C 49/0062;
(Continued)

(56) References Cited

U.S. PATENT DOCUMENTS 9,339,969 B2 * 5/2016 Asbrand ............... B29C 49/783
2004/0173949 A1 9/2004 Storione et al. .............. 264/529
(Continued)

FOREIGN PATENT DOCUMENTS

CN 104228042 12/2014 ............. B29C 49/28
DE 102004014653 10/2005 ............. B29C 49/16
(Continued)

OTHER PUBLICATIONS

U.S. Appl. No. 18/243,979, filed Sep. 8, 2023, Hengl et al.
(Continued)

*Primary Examiner* — Alison L Hindenlang
*Assistant Examiner* — Shibin Liang
(74) *Attorney, Agent, or Firm* — HAYES SOLOWAY P.C.

(57) ABSTRACT

An apparatus for forming plastic preforms into plastic containers having a transport device which transports the preforms to be formed along a predetermined transport path, wherein the transport device has a rotatable transport carrier on which a plurality of forming stations are arranged which each have a blow-molding device within which the preforms can be formed into the containers. The forming stations each have a pressurizing device which pressurizes the preforms with a flowable medium, i.e., compressed air, wherein the pressurizing device subjects the preforms to a preblowing pressure, at least one and preferably two intermediate blowing pressures, and a final blowing pressure. The apparatus has a detection device which is configured for detecting at least one value characteristic of the plastic container, wherein depending on this value characteristic of the container, the duration of the pressure rise time of at least one intermediate blowing pressure can be regulated.

8 Claims, 2 Drawing Sheets

(51) Int. Cl.
*B29C 49/42* (2006.01)
*B29C 49/80* (2006.01)

(52) U.S. Cl.
CPC .. *B29C 49/42095* (2022.05); *B29C 49/42855* (2022.05); *B29C 2049/7833* (2022.05); *B29C 2049/7834* (2022.05); *B29C 2049/7882* (2022.05); *B29C 2049/801* (2022.05); *B29C 2791/002* (2013.01)

(58) Field of Classification Search
CPC ........ B29C 49/42065; B29C 49/42095; B29C 49/42855; B29C 2049/7833; B29C 2049/7834; B29C 2049/7882; B29C 2049/801; B29C 2791/002
See application file for complete search history.

(56) References Cited

U.S. PATENT DOCUMENTS

| | | | | |
|---|---|---|---|---|
| 2008/0164642 | A1 | 7/2008 | Hirdina | 264/528 |
| 2008/0191394 | A1 | 8/2008 | Elliott | |
| 2009/0108505 | A1 | 4/2009 | Steiner | 264/535 |
| 2010/0090375 | A1 | 4/2010 | Geltinger et al. | |
| 2010/0171243 | A1 | 7/2010 | Zoppas et al. | 264/529 |
| 2011/0057343 | A1 | 3/2011 | Brunner et al. | 264/40.1 |
| 2011/0175246 | A1 | 7/2011 | Winzinger | 264/40.1 |
| 2011/0260350 | A1 | 10/2011 | Haesendonckx et al. | 264/40 |
| 2012/0226376 | A1 | 9/2012 | Haesendonckx et al. | |
| 2012/0227825 | A1 | 9/2012 | Voth et al. | 137/14 |
| 2014/0110873 | A1 | 4/2014 | Asbrand et al. | B29C 49/783 |
| 2016/0136868 | A1 | 5/2016 | Haller | B29C 49/78 |
| 2016/0151957 | A1* | 6/2016 | Wolfe | B29C 49/6409 425/143 |
| 2016/0176099 | A1 | 6/2016 | Knapp | |
| 2019/0315039 | A1 | 10/2019 | Huettner et al. | B29C 49/06 |
| 2023/0100387 | A1 | 3/2023 | Brunner et al. | |
| 2024/0083090 | A1 | 3/2024 | Hengl et al. | |
| 2024/0083091 | A1 | 3/2024 | Hengl et al. | |
| 2024/0083098 | A1 | 3/2024 | Meier et al. | |
| 2024/0408808 | A1 | 12/2024 | Kulzer et al. | |

FOREIGN PATENT DOCUMENTS

| | | | |
|---|---|---|---|
| DE | 102008034934 | 4/2009 | B29C 49/78 |
| DE | 102009041013 | 3/2011 | B29C 49/18 |
| DE | 102011110962 | 2/2013 | B29C 49/42 |
| DE | 102012110023 | 4/2014 | B29C 49/18 |
| DE | 102014116891 | 5/2016 | B29C 49/78 |
| EP | 1175990 | 1/2002 | B29C 49/78 |
| EP | 1974892 | 10/2008 | B29C 49/78 |
| EP | 2345524 | 7/2011 | B29C 49/78 |
| EP | 2441562 | 4/2012 | B29C 49/42 |
| EP | 2497619 | 9/2012 | B29C 49/42 |
| EP | 2352633 | 12/2012 | B29C 49/78 |
| EP | 2722153 | 4/2014 | B29C 49/78 |
| GB | 2431372 | 4/2007 | B29C 49/18 |
| WO | 2007077241 | 7/2007 | B29C 49/78 |
| WO | 2013023789 | 2/2013 | B29C 49/16 |

OTHER PUBLICATIONS

U.S. Appl. No. 18/243,986, filed Sep. 8, 2023, Hengl et al.
U.S. Appl. No. 18/244,037, filed Sep. 8, 2023, Hengl et al.
U.S. Appl. No. 18/244,102, filed Sep. 8, 2023, Meier et al.
Extended Search Report issued in EPO Patent Appln. Serial No. 23193133.8-1014, dated Feb. 5, 2024, with machine English translation, 8 pages.
Extended Search Report issued in EPO Patent Appln. Serial No. 23193217.9-1014, dated Feb. 22, 2024, with machine English translation, 19 pages.
Extended Search Report issued in EPO Patent Appln. Serial No. 23193185.8-1014, dated Feb. 5, 2024, with machine English translation, 8 pages.
Extended Search Report issued in EPO Patent Appln. Serial No. 23194549.4-1014, dated Feb. 7, 2024, with machine English translation, 9 pages.
Extended Search Report issued in EPO Patent Appln. Serial No. 23194845.6-1014, dated Feb. 9, 2024, with machine English translation, 8 pages.
Search Report issued in German Patent Appln. Serial No. 10 2022 122 885.1, dated Apr. 12, 2023, with machine English translation, 12 pages.
Search Report issued in German Patent Appln. Serial No. 10 2022 122 880.0, dated Apr. 28, 2023, with machine English translation, 7 pages.
Search Report issued in German Patent Appln. Serial No. 10 2022 122 879.7, dated Mar. 14, 2023, with machine English translation, 11 pages.
Search Report issued in German Patent Appln. Serial No. 10 2022 122 883.5, dated Mar. 14, 2023, with machine English translation, 9 pages.
Search Report issued in German Patent Appln. Serial No. 10 2022 122 878.9, dated Apr. 13, 2023, with machine English translation, 10 pages.

* cited by examiner

APPARATUS AND METHOD FOR FORMING PLASTIC PREFORMS INTO PLASTIC CONTAINERS WITH REGULATION OF THE PRESSURE RISE TIME

CROSS REFERENCE TO RELATED APPLICATION

This application claims priority to German Patent Application Serial No. 10 2022 122 885.1, filed Sep. 8, 2022, the contents of which are incorporated herein by reference.

BACKGROUND OF THE INVENTION

The present invention relates to an apparatus and a method for forming plastic preforms into plastic containers. Such apparatuses and methods have long been known from the prior art. The forming apparatus and in particular the blow molding machine or the stretch blow molding machine has a plurality of forming stations with blow molding devices which form a cavity which corresponds to the negative shape of the plastic container to be produced. In this case, the plastic preforms are usually stretched in the longitudinal direction within the blow molding devices with a stretching bar and are subsequently formed into the plastic containers by applying a flowable medium. The flowable medium is applied in a plurality of different pressure stages with different pressure levels.

It is known from the internal prior art of the applicant to apply three pressure stages (P1, Pi, P2) to the plastic preforms or plastic containers, wherein two thereof are preferably supplied completely or also partially with recycled air (P1 and Pi). More recently, a change has been made to add another (intermediate) pressure stage (Pi2). This can also be supplied with recycled air.

With the introduction of this additional intermediate blowing stage, various machine inputs were changed. In the internal prior art of the applicant, a so-called slider is provided, which defines the share (of time) for intermediate blowing in the shaping phase (intermediate blowing and final blowing). Other input options such as input fields or the like would also be conceivable. The shorter the pressure rise time for the intermediate blowing stage(s), the earlier the plastic preforms can be subjected to the final blowing pressure, which is particularly advantageous when there are demanding or complicated container shapes. On the other hand, the longer the pressure rise time for the intermediate blowing stage(s), the higher the amount of compressed air that can be recycled, wherein a saturation state occurs at a certain, not directly predictable point. Depending on the application, it may not be possible to exploit the maximum recycling potential and at the same time achieve the required container quality.

In addition, the ideal slider position must be manually established by the operator. To do this, the operator must visually assess the container quality and, if the compressed air recovery still has "reserves", can further increase the pressure rise time for the intermediate blowing stage(s) to optimize air consumption. This procedure is repeated until either the saturation state is reached or the container quality has reached the lower limit.

This procedure is very prone to errors and time-consuming, and consistent container quality also cannot be ensured for different batches since the slider must be readjusted every time, wherein the particular adjustment is also dependent on the currently responsible operator and therefore is not reproducible.

The object of the present invention is therefore to provide an apparatus and a method which enable automatic adjustment or regulation of the pressure rise time.

SUMMARY OF THE INVENTION

The invention is therefore directed an apparatus for forming plastic preforms into plastic containers having a transport device which transports the plastic preforms to be formed along a predetermined transport path, wherein the transport device has a rotatable transport carrier on which a plurality of forming stations are arranged which each have a blow-molding device within which the plastic preforms can be formed into the plastic containers, wherein the forming stations each have a pressurizing device which pressurizes the plastic preforms with a flowable medium and, in particular, compressed air, wherein the pressurizing device subjects the plastic preforms to a preblowing pressure, at least one and preferably two intermediate blowing pressures, and a final blowing pressure. Furthermore, the apparatus has a regulating device which is suitable and intended for regulating a duration of a pressure rise time of at least one intermediate blowing pressure. It is preferably also conceivable for the plastic preforms to be subject to more than two intermediate blowing pressures and accordingly preferably with n-intermediate blowing pressures (Pi1, Pi2, Pi3, etc.).

According to the invention, the apparatus has a detection device which is suitable and intended for detecting at least one value characteristic of the plastic container, wherein depending on this value characteristic of the plastic container, the duration of the pressure rise time of at least one intermediate blowing pressure can be regulated. Preferably, the duration of the pressure rise time is regulated automatically as a function of the value characteristic of the plastic container. The pressure rise time of the intermediate blowing pressure is the time period during which the plastic container is subjected to the intermediate blowing pressure/the intermediate blowing pressures. The shorter this is, the more likely the application of the final blowing pressure can be started. However, the higher this is, the more compressed air can be recycled and used for the next forming process.

Accordingly, it is proposed that an optimal adjustment of the pressure rise time of the intermediate blowing pressure is determined by means of a detection device, such as an image recording device, which is already present in existing systems in certain circumstances, and that the regulation device is accordingly controlled (fully) automatically for this purpose. An optimal adjustment enables good quality of the plastic containers with the lowest possible compressed air consumption.

In principle, the system strives for the pressure rise time at which the so-called effectiveness (calculated value visualized on the operator terminal (HMI) which reports the efficiency of the air recovery (compressed air recycling) of both intermediate blowing stages) just reaches 100%. However, as soon as the container quality falls below a critical level, the controller value may no longer increase, i.e. the pressure rise time may not be increased further, even if the optimal recycling has not yet been achieved. The container quality accordingly has priority over the recycling volume.

Advantageously, the point or adjustment between good container quality with the shortest possible pressure rise time and minimum compressed air consumption should preferably be found automatically.

For this purpose, as described above, a characteristic value is determined of the plastic container and preferably of a plastic container shaped with the device.

The characteristic value is then sent to an evaluation (evaluation device) which determines the quality of the plastic container therefrom. If the container quality is good, the regulating device is preferably controlled or adjusted such that it reduces the pressure rise time. If the container quality is poor, the regulating device is preferably controlled or adjusted such that it increases the pressure rise time. This process can be repeated until sufficient container quality is achieved with as little compressed air consumption as possible. Advantageously, the adjustment of the regulating with the relevant values for the pressure rise time and characteristic values for container quality can be saved in a memory device. These saved values can then be selected during the next production of this container type.

The regulating device therefore preferably regulates the duration of the pressure rise time, i.e. the duration of time with which the plastic container is pressurized with the intermediate blowing pressure.

In a preferred embodiment, the apparatus therefore has an evaluation device which is suitable and intended for evaluating and/or assessing the at least one characteristic value detected by the detection device for the plastic container in such a way that a conclusion can be drawn about the quality of the plastic containers. Accordingly, a control loop is preferably conceivable in which the detection device and/or the evaluation device evaluates the bottle quality, for example clouding of the bottle side wall or bottle base, in each case due to crazing.

In a further preferred embodiment, the evaluation device is suitable and intended to compare the at least one value characteristic of the plastic container detected by the detection device with predetermined and/or saved values. Preferably, an actual value (detected characteristic value) is compared with a target value (saved value). The at least one value characteristic of the plastic container or the actual value detected by the detection device is thereby preferably compared with a predetermined and/or saved range, in particular whether the characteristic value lies within a predetermined range. The characteristic value can be, for example, a surface condition (color, turbidity, roughness) of the plastic container, a diameter or other dimensions of the container, or the like.

The apparatus therefore preferably has a memory device in which a plurality of predetermined values and/or ranges characteristic of the plastic container are saved. Preferably, the characteristic value can also be an image or an image characteristic of the plastic container. In this case, the detection device is preferably an image recording device such as a camera which captures or records an image of the plastic container. The predetermined values and/or ranges can preferably be parameters specified for the finished plastic container, which parameters were selected or input by the operator at an operating terminal. The pressure rise time can preferably also be determined on the basis of these parameters specified for the finished plastic container.

Accordingly, the memory device is preferably also suitable and intended for saving images, and the evaluation device is suitable and intended for comparing the characteristic image recorded by the detection device with images saved in the memory device.

In a further preferred embodiment, the captured values are compared with target values which are preferably saved in a cloud (big data). The cloud can be supplied with values from different machines of different customers.

As mentioned above, depending on this characteristic value which gives information about a quality of the plastic container, the control device is then adjusted, which in turn regulates the pressure rise time. In a further preferred embodiment, the regulating device is smoothly displaceable between a minimum value and a maximum value of the pressure rise time. The minimum value and the maximum value of the pressure rise time are fixedly predetermined by the device. Preferably, the regulating device comprises a slider on a graphical user interface such as, for example, an operating terminal of the device. Until now, it has been necessary to manually adjust it or its position. With the invention, it is now proposed to automatically adjust or regulate the position of the slider depending on a container quality.

The evaluation device can preferably also be an AI (artificial intelligence) or a computing unit which evaluates and assesses the characteristic value and correspondingly activates or adjusts the regulating device. The AI or computing unit can be connected locally to the device. However, the AI or the computing unit is preferably connected wirelessly to the device. Particularly preferably, an artificial neural network is used as AI, which was trained by monitored learning to train the system to make the desired adaptations when there are process fluctuations. In so doing, a specific result is specified for the different input options. On the basis of the continuous comparison between the target and actual result, the network learns to link the neurons appropriately. However, it would also be possible to train the artificial neural network using unsupervised learning, reinforcement learning, or stochastic learning.

The plastic container is pressurized in a pre-blowing phase and a shaping phase, wherein the pre-blowing pressure is applied to the plastic container in the pre-blowing phase and the at least one and preferably two intermediate blowing pressures and the final blowing pressure are applied in the shaping phase.

The pre-blowing pressure is applied to the plastic containers for at least 100 ms, preferably at least 110 ms and particularly preferably at least 115 ms. Preferably, the at least one intermediate blowing pressure and the final blowing pressure are applied to the plastic containers for at least 250 ms, preferably at least 265 ms and particularly preferably at least 280 ms. The start of the application of the final blowing pressure preferably depends on the pressure rise time of the intermediate blowing pressures.

In a further preferred embodiment, the apparatus has a valve arrangement which controls the application of the pre-blowing pressure, the at least one and preferably two intermediate blowing pressures, and the final blowing pressure to the plastic containers.

The apparatus for forming plastic preforms into plastic containers is, as mentioned above, preferably a blow molding device or a forming station. The blow molding devices are preferably formed in multiple parts and have two blow mold halves and a bottom mold. These blow mold halves are preferably detachably arranged on a mold carrier shell or on the blow mold carriers. The blow mold carriers are pivotable relative to one another in order to open and close the blow molding devices. In addition, the blow mold carrier has locking mechanisms in order to lock the mold halves against each other during the blowing process.

The plastic preforms are preferably expanded into the plastic containers by applying compressed air. For this purpose, the apparatus preferably has a pressurizing device and blowing nozzle which can be applied to an opening in the plastic preforms in order to apply compressed air to the plastic preforms and expand them by means of compressed air.

Particularly preferably, the pressurizing device and in particular the blowing piston and/or the blowing nozzle can be moved in a longitudinal direction of the plastic container and/or can be moved toward the plastic container.

In a further preferred embodiment, the blow molding devices or the forming stations each have stretching bars which stretch the plastic preforms in their longitudinal direction. Particularly preferably, the blow molding machine or the carrier and the forming stations are arranged within a clean room which delimits the blow molding machine from a nonsterile environment. Drive devices for closing, locking and/or opening the blow molds are preferably outside the clean room.

The blow molding devices are preferably transported within the cleanroom, wherein the cleanroom is preferably bounded by several walls. Preferably, the clean room is bounded by at least one standing wall and a wall that moves relative to this standing wall. In this case, for example, the transport carrier on which the blow molding devices are arranged can already have or form one of these walls, and in particular the moving wall. The cleanroom separates the blow molding devices in particular from a non-sterile environment.

The present invention is also directed to a method for forming plastic preforms into plastic containers, wherein the plastic preforms to be formed are transported along a predetermined transport path, wherein a plurality of forming stations are arranged on a rotatable transport carrier, wherein the forming stations each have a blow molding device within which the plastic preforms are formed into the plastic containers, wherein the forming stations each have a pressurizing device which pressurizes the plastic preforms with a flowable medium and in particular compressed air, wherein the pressurizing device pressurizes the plastic preforms with a pre-blowing pressure, at least one and preferably two intermediate blowing pressures and a final blowing pressure, and a regulating device regulates a duration of a pressure rise time of at least one intermediate blowing pressure.

According to the invention, at least one value characteristic of the plastic container is detected, wherein depending on this value characteristic of the plastic container, the duration of the pressure rise time of at least one intermediate blowing pressure is regulated.

Accordingly, the method also proposes determining an optimal adjustment of the pressure rise time of the intermediate blowing pressure and, in particular, accordingly (fully) automatically controlling the regulating device as a function of a value characteristic of the plastic container.

In a preferred embodiment of the method, the at least one value characteristic of the plastic container is compared with predetermined and/or saved values. The characteristic value can preferably also be an image characteristic for the plastic container or an image of the plastic container, wherein in this case, the characteristic image is compared with a saved image. The characteristic value or the characteristic image is preferably characteristic of a quality of the plastic container.

In this case, the above-described apparatus is in particular also configured and intended to carry out this described method, i.e. all mentioned features of the above-described apparatus are also disclosed for the method described in this context and vice versa.

Further advantages and embodiments result from the accompanying drawings.

DETAILED DESCRIPTION OF THE DRAWINGS

Figure 1:
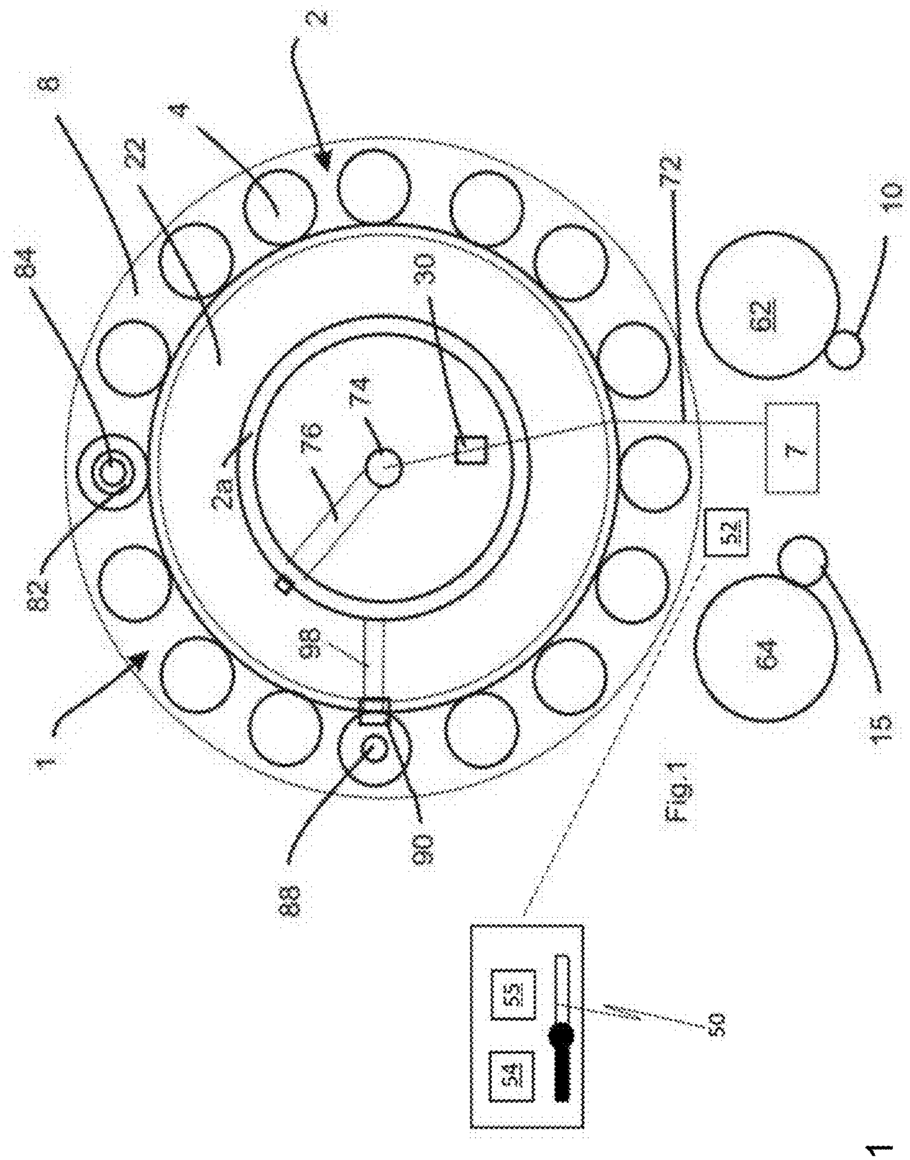
FIG. 1 shows a schematic view of an apparatus for forming plastic preforms into plastic containers.

FIG. 1 shows an apparatus) for forming plastic preforms 10 into plastic containers 15. This apparatus 1 has a rotatable carrier 22 on which a large number of forming stations 4 is arranged. These individual forming stations 4 each have blow molding devices 82, which in their interior form a cavity for expanding the plastic preforms.

Reference sign 84 denotes a pressurization device which is used to expand the plastic preforms 10 to expand them. Reference sign 90 denotes a valve arrangement, such as a valve block, which preferably has a large number of valves that control the application of different pressure levels to the plastic preforms.

In a preferred embodiment of the method, first a pre-blowing pressure P1, then at least one intermediate blowing pressure Pi that is higher than the pre-blowing pressure, and finally a final blow molding pressure P2 that is higher than the intermediate blowing pressure Pi are applied to the plastic preforms. After expansion of the plastic containers, the pressures or compressed air are preferably returned from the container to the individual pressure reservoirs.

The reference sign 88 designates a stretching bar which serves to stretch the plastic preforms in their longitudinal direction, and the reference sign 30 designates stretching unit which controls the movement of the stretching bar. Preferably, all forming stations have such blow molds 82 along with stretching bars 88. The number of these forming stations is preferably between 2 and 100, preferably between 4 and 60, preferably between 6 and 40.

The plastic preforms 10 are fed via a feed device 62 such as, in particular, but not exclusively to a transport star of the apparatus, and the formed plastic containers 15 are removed via a removal device 64.

Reference sign 7 denotes a pressure supply device, such as a compressor or also a compressed-air connection. The compressed air is conveyed via a first connecting line 72 to a rotary distributor 74 and discharged therefrom via a second connecting line 76 to the annular channel 2*a*.

In addition to such annular channel 2*a* shown, further annular channels are preferably provided, which are, however, concealed by, e.g., lie underneath, the annular channel 2*a* in the illustration shown in FIG. 1. A plurality of annular channels are preferably arranged one above the other. Reference sign 98 denotes a third connecting line that delivers the compressed air to a forming station 4 or the valve assembly 90 thereof. Preferably, each of the annular channels is connected to all forming stations via corresponding connecting lines.

Reference sign 8 schematically denotes a clean room, which is preferably annular here and surrounds the transport path of the plastic preforms 10. Preferably, a (geometric) axis of rotation, with respect to which the transport carrier is rotatable, is arranged outside the clean room 8. Preferably, the clean room is sealed from the non-sterile environment by a sealing device, which preferably has at least two surge tanks.

The reference sign 52 denotes a detection device for detecting a characteristic value, such as an image of the plastic container. This detection device can also be arranged at one point on the device 1. As indicated by the dashed line, the detected characteristic value or the detected characteristic image is preferably transmitted wirelessly to an evaluation device 54 which evaluates the image in the manner described above, or compares it with values saved in the memory device 55. The reference sign 50 designates a regulating device, such as in this case a shift register, which is adjusted according to the result of the evaluation.

Figure 2:
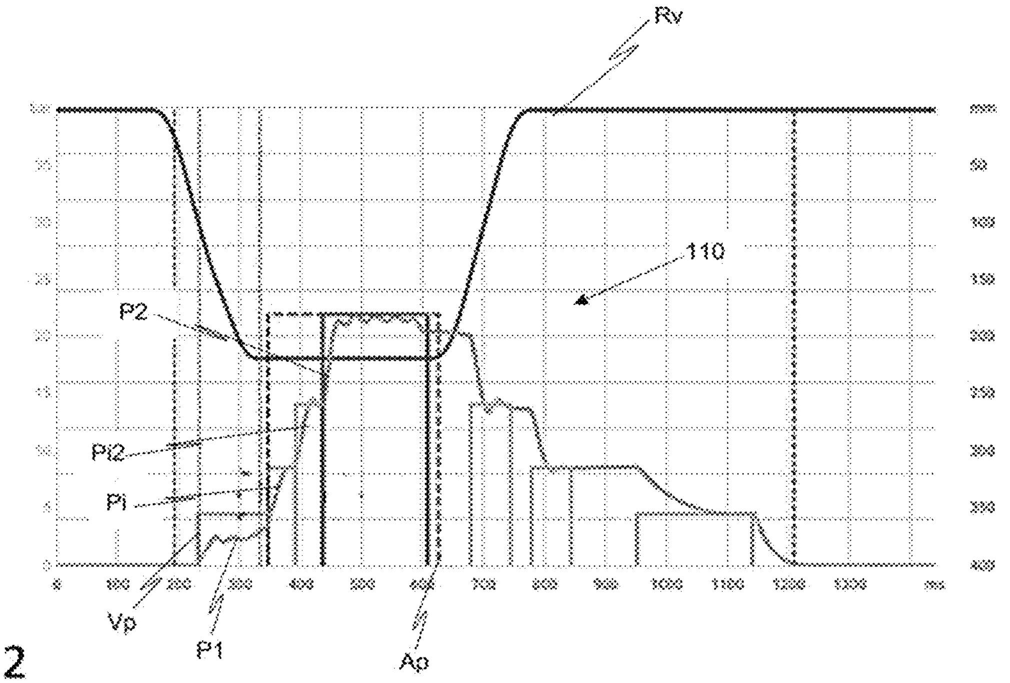
FIG. 2 shows a diagram of a blowing curve.

FIG. 2 shows a diagram of a blowing curve 110. The reference sign Vp designates the pre-blowing phase during which the pre-blowing pressure P1 is applied. The formation phase Ap is represented by the dashed lines, wherein the region within the solid line within the dashed line represents the application of the final blowing pressure P2, and the region to the left of the solid line (between the solid and dashed lines) represents the application of the intermediate blowing pressures Pi and Pi2. After the application of the final blowing pressure P2, it is held for a certain time. Subsequently, the used compressed air is recycled and the container is relieved, which is represented by the falling curve. The reference sign Rv designates the curve of the stretching bar.

Figure 3:
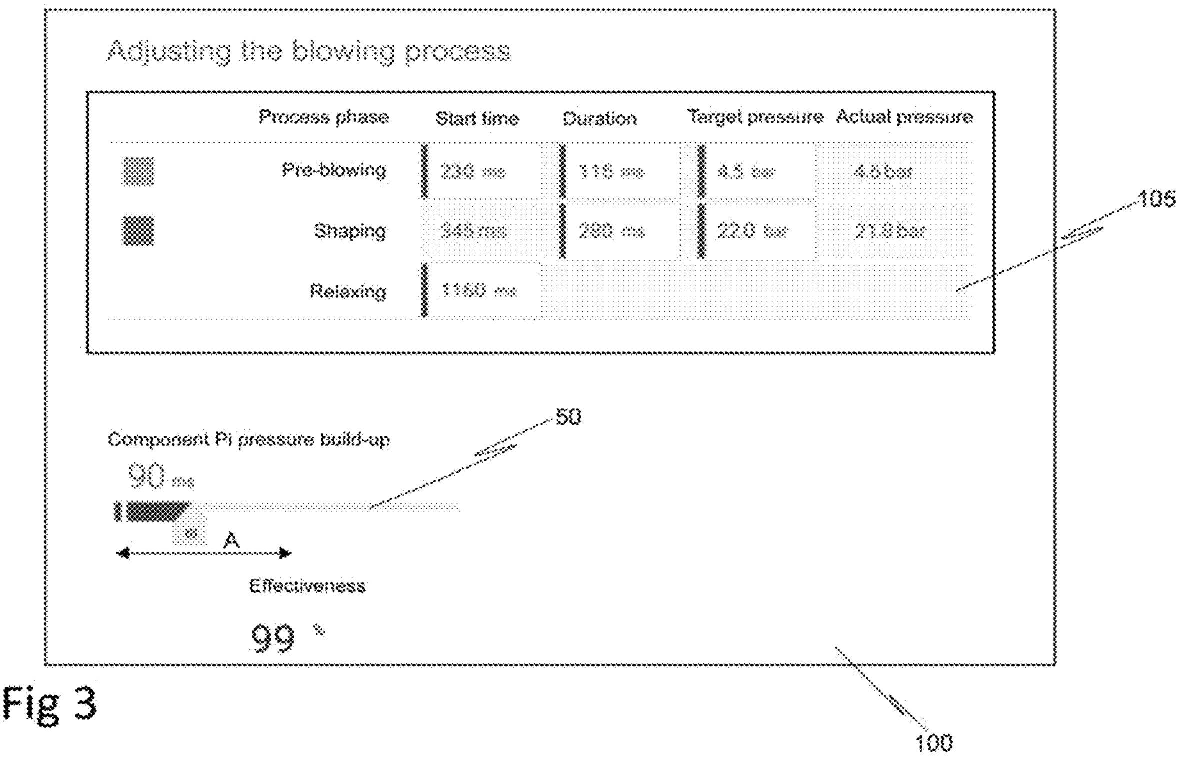
FIG. 3 shows an example of an adjustment of the forming process.

FIG. 3 shows an example of an adjustment of the forming process. This is in particular an exemplary representation of the individual values on an operating terminal 100 of the device. In particular, the profile depicted in FIG. 2 is shown here.

As can be seen from the x-axis of FIG. 2 and the display 105 of FIG. 3, the pre-blowing phase Vp starts at 230 ms and lasts 115 ms, so that at 345 ms, the formation phase Ap starts which in turn lasts 280 ms and therefore ends at 625 ms.

The reference sign 50 designates the regulating device, such as in this case a slider which is displaceable as illustrated by the arrow A. This is adjusted so that the intermediate blowing pressures Pi, Pi2 are applied for 90 ms, which leads to a 99% effectiveness of the process. Preferably, the position of this regulating device is automatically adjusted and adapted using the described method or the described apparatus, in particular depending on a characteristic value and/or the quality of the plastic containers.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

LIST OF REFERENCE SIGNS

1 apparatus
2 transport device
2*a* annular channel
4 forming station
7 pressure supply device
8 clean room
plastic preform
plastic container
22 transport carrier
stretch unit
50 regulation device
52 detection device
54 evaluation device
55 storage device 62 feed device
64 discharge device
72 first connecting line
74 rotary distributor
76 second connecting line
82 blow molding device
84 pressurizing device
88 stretching bar
90 valve assembly
98 third connecting line
100 operating terminal
105 display
110 Blowing curve
A arrow
Ap forming phase
Vp pre-blowing phase
P1 pressure P1, pre-blowing pressure
Pi pressure Pi, intermediate blowing pressure
Pi2 pressure Pi2, intermediate blowing pressure
P2 pressure P2, final blowing pressure
Rv curve of the stretching bar

The invention claimed is:

1. An apparatus for forming plastic preforms into plastic containers with a transport device configured to transport the plastic preforms to be formed along a predetermined transport path, wherein the transport device has a rotatable transport carrier on which a plurality of forming stations are arranged which each have a blow molding device within which the plastic preforms are formed into the plastic containers, wherein the forming stations each have a pressurizing device configured to pressurize the plastic preforms with a flowable medium, wherein the pressurizing device is configured to pressurize the plastic preforms with a pre-blowing pressure, at least one intermediate blowing pressure and a final blowing pressure, and the apparatus has a regulating device which is configured for regulating a duration of a pressure rise time of at least one intermediate blowing pressure, wherein the apparatus has a detection device which is configured for detecting at least one value characteristic of the plastic container, wherein depending on the value characteristic of the plastic container, the duration of the pressure rise time of at least one intermediate blowing pressure is automatically regulated as a function of the value characteristic of the plastic container, so that a point or adjustment between good container quality with the shortest possible pressure rise time and minimum compressed air consumption is determined automatically from the determined value characteristic of the plastic container, wherein the apparatus has an evaluation device which is configured for evaluating and/or assessing the at least one characteristic value detected by the detection device for the plastic container in such a way that a conclusion can be drawn about the quality of the plastic containers, and wherein the evaluation device is configured to compare the at least one value characteristic of the plastic container detected by the detection device with predetermined and/or saved values.

2. The apparatus according to claim 1, wherein the detected values are compared with target values.

3. The apparatus according to claim 1, wherein the regulating device is smoothly displaceable between a minimum value and a maximum value of the pressure rise time.

4. The apparatus according to claim 1, wherein the detection device is an image recording device.

5. The apparatus according to claim 4, wherein the image recording device is a camera.

6. The apparatus according to claim 1, wherein the apparatus has a valve arrangement configured to control the application of the pre-blowing pressure, the at least one intermediate blowing pressure, and the final blowing pressure to the plastic containers.

7. A method for forming plastic preforms into plastic containers, wherein the plastic preforms to be formed are transported along a predetermined transport path, wherein a plurality of forming stations are arranged on a rotatable transport carrier, wherein the forming stations each have a blow molding device within which the plastic preforms are formed into the plastic containers, wherein the forming stations each have a pressurizing device which pressurizes the plastic preforms with a flowable medium, wherein the pressurizing device pressurizes the plastic preforms with a pre-blowing pressure, at least one intermediate blowing pressure and a final blowing pressure, and a regulating device regulates a duration of a pressure rise time of at least one intermediate blowing pressure, wherein at least one value characteristic of the plastic container is detected using the detection device as claimed in claim 1, wherein depending on the value characteristic of the plastic container, the duration of the pressure rise time of at least one intermediate blowing pressure is automatically regulated as a function of the value characteristic of the plastic container, so that a point or adjustment between good container quality with the shortest possible pressure rise time and minimum compressed air consumption is determined automatically from the determined value characteristic of the plastic container, wherein an evaluation device is provided which is configured for evaluating and/or assessing the at least one characteristic value detected by the detection device for the plastic container in such a way that a conclusion can be drawn about the quality of the plastic containers, and wherein the evaluation device is configured to compare the at least one value characteristic of the plastic container detected by the detection device with predetermined and/or saved values.

8. The method according to claim 7, wherein the at least one value characteristic of the plastic container is compared with predetermined and/or saved values.

* * * * *